(12) United States Patent
Hellgren et al.

(10) Patent No.: US 11,982,651 B2
(45) Date of Patent: May 14, 2024

(54) METHOD FOR ADAPTING THE CONCENTRATION OF A SAMPLE GAS IN A GAS MIXTURE TO BE ANALYSED BY A GAS CHROMATOGRAPH ASSEMBLY, AND CHROMATOGRAPH ASSEMBLY THEREFORE

(71) Applicant: INFICON GmbH, Cologne (DE)

(72) Inventors: Johan Hellgren, Linkoping (SE); Henrik Vennerberg, Linkoping (SE)

(73) Assignee: INFICON GmbH, Cologne (DE)

( * ) Notice: Subject to any disclaimer, the term of this patent is extended or adjusted under 35 U.S.C. 154(b) by 203 days.

(21) Appl. No.: 17/262,854

(22) PCT Filed: Jul. 26, 2019

(86) PCT No.: PCT/EP2019/070160
§ 371 (c)(1),
(2) Date: Jan. 25, 2021

(87) PCT Pub. No.: WO2020/021057
PCT Pub. Date: Jan. 30, 2020

(65) Prior Publication Data
US 2021/0318271 A1   Oct. 14, 2021

(30) Foreign Application Priority Data
Jul. 26, 2018 (EP) .................................. 18185795

(51) Int. Cl.
*G01N 30/06* (2006.01)
*G01N 30/88* (2006.01)

(52) U.S. Cl.
CPC ............. *G01N 30/06* (2013.01); *G01N 30/88* (2013.01); *G01N 2030/8854* (2013.01)

(58) Field of Classification Search
CPC ..................................................... G01N 30/88
See application file for complete search history.

(56) References Cited

U.S. PATENT DOCUMENTS

| 4,220,040 A | * | 9/1980 | Noguchi | G01N 29/024 73/24.01 |
| 4,629,705 A | * | 12/1986 | Cortes | G01N 30/96 210/656 |

(Continued)

FOREIGN PATENT DOCUMENTS

| CN | 101004241 A | 7/2007 |
| CN | 201886003 U | 6/2011 |

(Continued)

*Primary Examiner* — Jamel E Williams
*Assistant Examiner* — Alex T Devito
(74) *Attorney, Agent, or Firm* — The Webb Law Firm

(57) ABSTRACT

Method for adapting the concentration of a sample gas in a gas mixture to be analysed by a gas chromatograph assembly, the assembly comprising a sample gas inlet, a secondary gas inlet, a gas chromatograph sensor, a gas chromatograph column, and a gas chromatograph bypass parallel to the column, characterized by
a) introducing sample gas through the sample gas inlet,
b) introducing secondary gas through the secondary gas inlet,
c) mixing the sample gas and the secondary gas to a gas mixture and conducting the mixture via the bypass,
d) circulating the mixture in a gas conducting loop comprising the bypass and the sensor,
e) repeating steps b), c) and d) without step a) to gradually reduce the concentration of sample gas within the mixture until the concentration reaches a desired predetermined level,
f) analysing the mixture by means of gas chromatography employing the column and the sensor.

10 Claims, 2 Drawing Sheets

(56) References Cited

U.S. PATENT DOCUMENTS

| | | | | |
|---|---|---|---|---|
| 5,826,632 | A | * 10/1998 | Micke | F17C 5/06 |
| | | | | 141/105 |
| 2012/0006487 | A1 | 1/2012 | Kikuchi et al. | |
| 2013/0199264 | A1 | 8/2013 | Seike | |
| 2016/0061798 | A1 | * 3/2016 | Wapelhorst | G01N 33/0011 |
| | | | | 356/402 |
| 2016/0320362 | A1 | 11/2016 | Schwieters et al. | |
| 2017/0122920 | A1 | 5/2017 | Spartz et al. | |
| 2017/0241961 | A1 | 8/2017 | Kim et al. | |

FOREIGN PATENT DOCUMENTS

| | | |
|---|---|---|
| CN | 102369591 A | 3/2012 |
| CN | 103331125 A | 10/2013 |
| CN | 203519401 U | 4/2014 |
| CN | 105122053 A | 12/2015 |
| CN | 205263040 U | 5/2016 |
| CN | 206020354 U | 3/2017 |
| CN | 106645522 A | 5/2017 |
| CN | 206450640 U | 8/2017 |
| CN | 107192791 A | 9/2017 |
| CN | 107525708 A | 12/2017 |
| CN | 207366326 U | 5/2018 |
| JP | H06-130045 A | 5/1994 |
| JP | 2002243599 A | 8/2002 |
| JP | 2011038994 A | 2/2011 |
| JP | 2016519772 A | 7/2016 |
| WO | 2013039487 A1 | 3/2013 |

* cited by examiner

METHOD FOR ADAPTING THE CONCENTRATION OF A SAMPLE GAS IN A GAS MIXTURE TO BE ANALYSED BY A GAS CHROMATOGRAPH ASSEMBLY, AND CHROMATOGRAPH ASSEMBLY THEREFORE

CROSS-REFERENCE TO RELATED APPLICATIONS

This application is the United States national phase of International Application No. PCT/EP2019/070160 filed Jul. 26, 2019, and claims priority to European Patent Application No. 18185795.4 filed Jul. 26, 2018, the disclosures of which are hereby incorporated by reference in their entirety.

BACKGROUND OF THE INVENTION

Field of the Invention

The disclosure concerns a method for adapting the concentration of a sample gas in a gas mixture to be analysed by a gas chromatograph assembly, as well as a gas chromatograph assembly for adapting the concentration of a sample gas to be analysed.

Description of Related Art

Gas chromatography is employed to separate gas components from a gas mixture and to detect these separated gas components. This is achieved by injecting small amounts of the gas mixture into a tube shaped column. The column is typically either a narrow capillary tube, the inner surface of which is provided with a surface active coating or a slightly larger tube filled with a surface active powder, which in both cases is called the "stationary phase". A carrier gas, such as hydrogen, helium or air is employed to carry the amount of the gas mixture to be analysed through the column. The carrier gas is usually referred to as the "mobile phase." Thus, the gas mixture to be analysed follows the mobile phase through the stationary phase, thereby pushing the gas mixture slowly through the stationary phase. Lighter components of the gas mixture travel faster, so that different gas components of the injected gas pulse leave the column at different times and can thus be detected one by one. The arrival time or travel time of the gas components is used to identify these. A gas chromatograph sensor is used in order to measure the time of arrival or travel time of each gas component. Gas chromatography is used in the forensic science, medicine and environmental protection fields.

Gas chromatography is also used in the field of gas leak detection, particularly for assessing whether a certain gas component measured on the ground surface originates from a leak in an underground pipeline carrying a natural gas. The main component of the natural gas and of gas from biological decay processes ("swamp gas") is methane. Swamp gas is produced when microorganisms digest biological waste. Before repair work for repairing a leak in a buried underground pipeline is initiated, it needs to be ensured that the gas detected at the ground surface does not originate from a swamp gas emission.

This can be achieved by means of gas chromatography. In this regard, it needs to be considered that natural gas always contains a certain amount of ethane, while swamp gas never contains any amount of ethane. Thus, if ethane is detected via gas chromatography, this is an indication that the gas detected on a ground surface does not originate from swamp gas but rather from a gas leak in an underground pipeline carrying natural gas, such as methane.

The concentration of sample gas in the gas sample analysed by the gas chromatograph is critical. On the one hand, the concentration needs to be high enough in order to achieve a sufficient measurement signal. On the other hand, the concentration must not exceed a certain value, in order to avoid overloading of the stationary phase within the gas chromatograph column. Overloading creates distorted peaks in the measurement signal and can lead to misinterpretation of the gas type, or can even result in covering or hiding peaks of several gas components. This is particularly critical for a simple column without any temperature control.

The object of the disclosure is to provide a method for adapting the concentration of a sample gas in a gas mixture to be analysed by a gas chromatograph assembly. A gas chromatograph assembly for adapting the concentration of a sample gas in a gas mixture to be analysed shall also be provided.

SUMMARY OF THE INVENTION

The gas chromatograph assembly of the disclosure comprises a sample gas inlet for introducing a sample gas to be analysed, a secondary gas inlet, as well as a gas chromatograph sensor, a gas chromatograph column, and a gas chromatograph bypass parallel to the column.

According to the disclosure,
a) an amount of sample gas is introduced into the gas chromatograph assembly through the sample gas inlet,
b) an amount of secondary gas is introduced through the secondary gas inlet,
c) the sample gas and the secondary gas are mixed to a gas mixture which is conducted via the gas chromatograph bypass,
d) circulating the gas mixture in a gas conducting loop comprising the gas chromatograph bypass and the gas chromatograph sensor,
e) steps b), c) and d) are repeated without step a) to gradually reduce the concentration of sample gas within the gas mixture until the concentration of sample gas within the gas mixture reaches a desired predetermined level, and
f) the gas mixture thus obtained is analysed by means of gas chromatography employing the gas chromatograph column and the gas chromatograph sensor.

In other words, a gas mixture is created from the sample gas which enters through the sample gas inlet, and from the secondary gas which enters through the secondary gas inlet. The gas mixture is conducted via the gas chromatograph bypass, such that the gas mixture can actually flow within the gas chromatograph assembly without being blocked by the column. The gas chromatograph bypass facilitates the mixing of the two gas components.

The disclosure achieves a gradual reduction of the concentration of sample gas within the gas mixture by repeating the introduction of the secondary gas and the mixing of the newly introduced secondary gas with the gas mixture already present within the gas chromatograph assembly without further introducing sample gas. The reduction of the sample gas concentration is performed until the concentration of sample gas within the gas mixture reaches a desired predetermined level, at which a sufficient measurement signal from the gas chromatograph sensor is generated without overloading of the stationary phase in the column.

The sample gas concentration is preferably measured during or before step d), e.g., before the introduction of sample gas or secondary gas is repeated, in order to determine whether the sample gas concentration has already reached the predetermined level. This measurement can be made with a secondary sensor assembly, such as an infrared sensor assembly. The sample gas introduced during step a) can be conducted through the secondary sensor assembly to the gas chromatograph sensor.

As an alternative to the sample gas concentration measurement during or before step d), the repeating according to step d) is performed a predetermined number of times without measuring the sample gas concentration.

The gas chromatograph assembly comprises a gas conducting loop comprising the gas chromatograph bypass and the gas chromatograph sensor, in order to achieve mixing of the sample gas and the secondary gas during circulation through the loop. In the case that the loop also comprises the secondary sensor assembly, the sample gas concentration can be measured at every cycle, or even continuously, in order to be able to measure and control the gradual increase or decrease of the sample gas concentration.

The loop may comprise a gas modulation valve being adapted to alternatingly connect either of the sample gas inlet and the secondary gas inlet with the loop. In this example, the secondary gas inlet can be a reference gas inlet which is usually employed to compare the gas sample with a reference gas. In particular, the gas modulation valve may connect the sample gas inlet with the loop during step a) while separating the secondary/reference gas inlet from the loop. Likewise, during step b) the gas modulation valve connects the secondary gas inlet with the loop while separating the sample gas inlet from the loop.

In a typical embodiment, the gas modulation valve connects the sample gas inlet and the secondary/reference gas inlet with the secondary sensor assembly, typically an infrared sensor assembly.

The secondary sensor assembly comprises a secondary sensor assembly inlet at a first end of the secondary sensor assembly, and a secondary sensor assembly outlet at a second end of the secondary sensor assembly. During step a), the secondary sensor assembly inlet may be connected to the sample gas inlet, while the reference gas inlet is separated from the secondary sensor assembly inlet. Gas is then drawn from the sample gas inlet through the secondary sensor assembly, and conducted to the gas chromatograph sensor via the gas chromatograph bypass. Likewise, in step b), the secondary sensor assembly inlet may be connected to the reference gas inlet, while separating the sample gas inlet from the secondary sensor assembly inlet. Gas is then drawn from the reference gas inlet through the secondary sensor assembly.

The gas mixture of the sample gas and the secondary gas (reference gas) may be circulated through a gas conducting loop comprising the secondary sensor assembly, the gas chromatograph sensor bypass, the gas chromatograph sensor, the gas modulation valve and a gas chromatograph valve.

The gas chromatograph valve can be a switching valve adapted to switch between the gas chromatograph column and the gas chromatograph bypass to conduct gas either through the gas chromatograph column or through the gas chromatograph bypass into the gas chromatograph sensor.

Preferably, during step c), both the sample gas inlet and the secondary inlet are separated from the loop. In particular, the secondary sensor assembly inlet may be separated from the reference gas inlet while still separating the sample gas inlet from the secondary sensor assembly inlet.

In general, it is preferred that the gas mixture is allowed to circulate in the loop for some time to mix the secondary gas and the sample gas. In particular, the secondary gas may be air. In order to achieve this, the secondary inlet may be an inlet from open atmosphere, i.e. an inlet being open to atmosphere.

A predetermined amount of the gas mixture may be injected into the gas chromatograph column by opening the gas chromatograph valve for a predetermined amount of time. After the gas chromatograph valve is closed, the gas chromatograph sensor/sensors may be purged by drawing air from either the sample gas inlet or the secondary/reference gas inlet, and conducting said air to the secondary sensor assembly and to the gas chromatograph sensor via the gas chromatograph bypass. Thereafter, the gas chromatograph valve may be opened and air can be drawn or pushed through the gas chromatograph column into the gas chromatograph sensor for analysing the gas mixture by means of gas chromatography.

In general, the disclosure allows to dilute the sample gas in repeated cycles, e.g., gradually, in a controlled manner. After measuring the sample gas concentration, the entire system may first be purged, and then the gas modulation valve may be used to draw a number of short pulses from the sample gas inlet and thereby inject sample gas in the stream of gas mixture, or air stream drawn from the secondary inlet. The stream of sample gas and secondary gas is then allowed to circulate in the loop for mixing before injecting a small amount of the obtained gas mixture into the gas chromatograph column.

BRIEF DESCRIPTION OF THE DRAWINGS

In the following, exemplary embodiments of the invention will be explained with reference to the figures. In particular.

DESCRIPTION OF THE INVENTION

Figure 1:
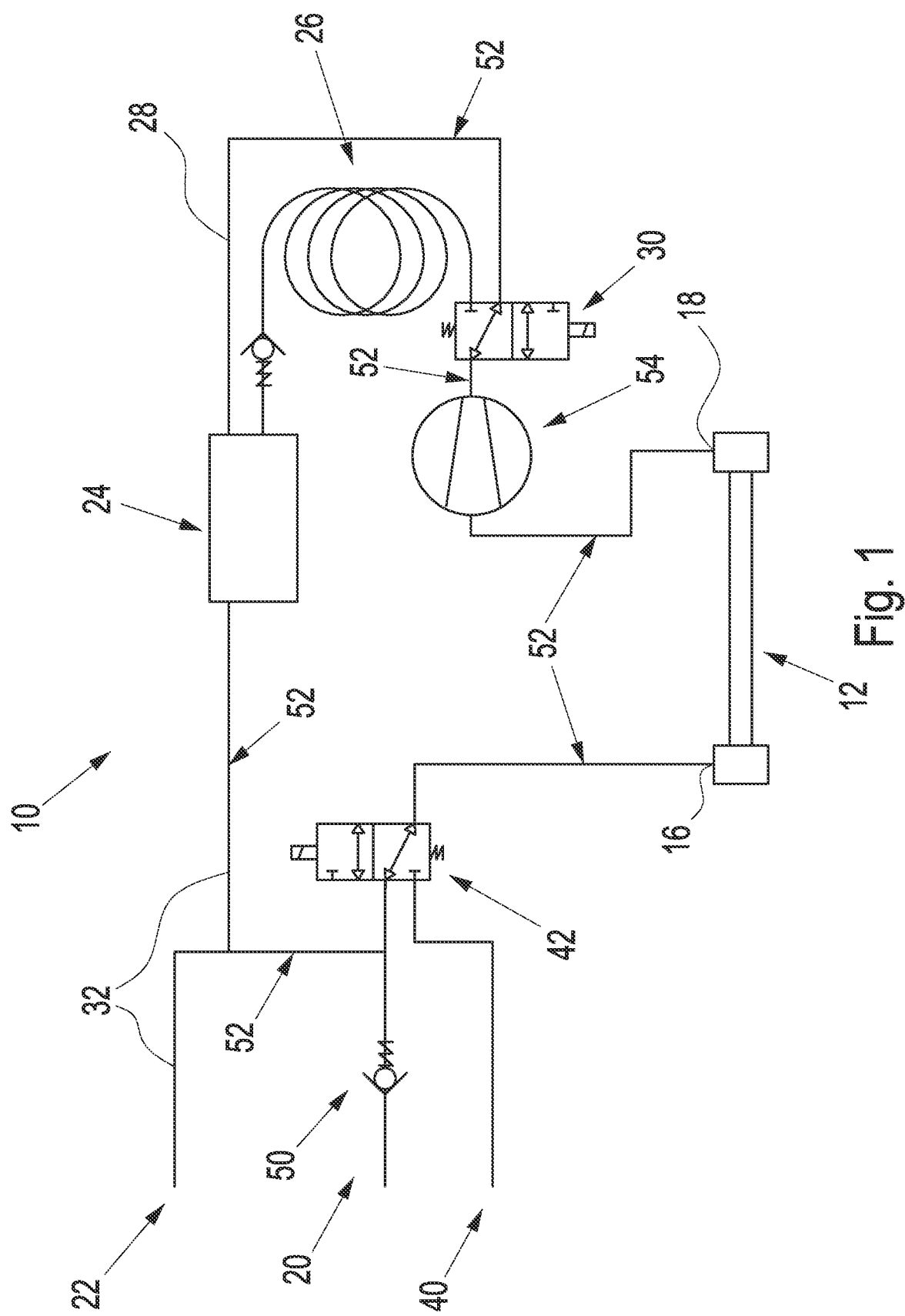
FIG. 1 shows the general layout of a first embodiment and FIG. 2 shows a general layout of a second embodiment.
Figure 2:
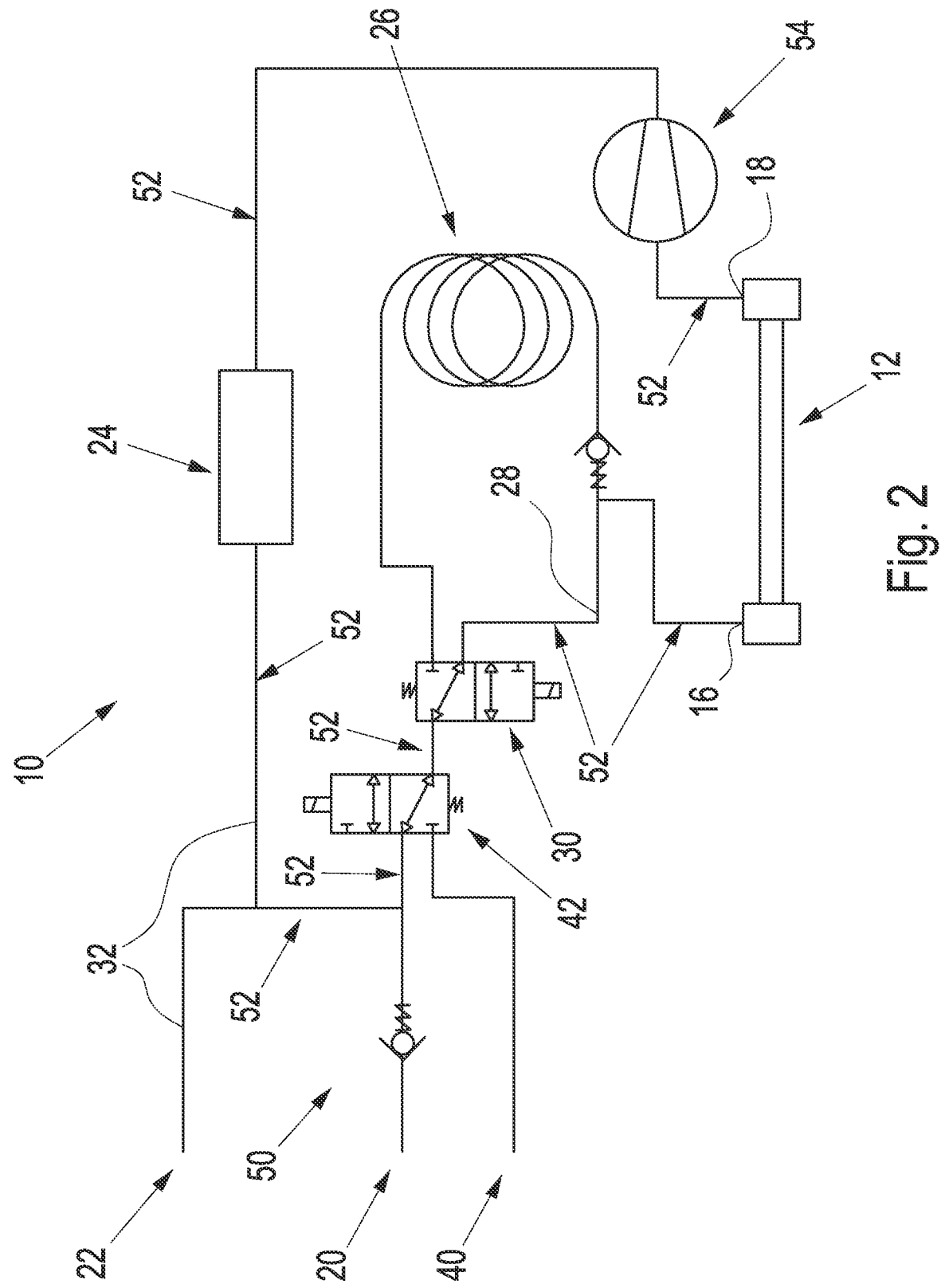

FIGS. 1 and 2 show a gas chromatograph assembly 10 comprising a sample gas inlet 20 for introducing a sample gas to be analysed, a secondary gas inlet 40, being a reference gas inlet which is open to atmosphere. The gas chromatograph assembly 10 further comprises a gas chromatograph sensor 24, a gas chromatograph column 26, and a gas chromatograph bypass 28 parallel to the column 26.

A gas chromatograph valve 30 is provided, being adapted to switch between the gas chromatograph column 26 and the gas chromatograph bypass 28 to conduct gas either through the gas chromatograph column 26 or the gas chromatograph bypass 28 into the gas chromatograph sensor 24.

A secondary sensor assembly 12 in the form of an infrared sensor assembly is provided for measurement of the sample gas concentration. The secondary sensor assembly 12 comprises a secondary sensor assembly inlet 16 at a first end, and a secondary sensor assembly outlet 18 at a second end of the secondary sensor assembly 12.

The sample gas inlet 20 and the secondary gas inlet 40 are connected in parallel to a gas modulation valve 42, which is adapted to alternatingly connect either of the sample gas inlet 20 and the secondary gas inlet 40 to the secondary sensor assembly 12. The sample gas inlet 20 is connected to the gas modulation valve 42 via a check valve 50.

The gas chromatograph sensor 24 is connected to an exhaust outlet 22 via an exhaust line 32. The exhaust line 32 is connected to the gas flow path connecting the sample gas inlet 20 and the gas modulation valve 42, thereby forming a loop 52. In particular, the loop 52 comprises the gas modulation valve 42, the secondary gas sensor assembly 12, the gas chromatograph valve 30, an additional gas pump 54 in the gas flow path connecting the secondary sensor assembly 12 and the gas chromatograph sensor 24, the bypass 28, the gas chromatograph sensor 24 and the exhaust line 32. Alternatively, the exhaust line 32 and the loop 52 may be connected to respective separate outlets of the sensor 24.

The loop 52 is adapted to circulate the gas mixture of the sample gas and of the secondary gas a number of times before measuring the sample gas concentration with the secondary gas sensor assembly 12. Once the sample gas concentration is sufficiently reduced, the gas chromatograph valve 30 switches from the gas chromatograph bypass to the gas chromatograph column 26 for a predetermined amount of time in order to inject a short gas pulse of the gas mixture into the column 26.

In both embodiments, the gas chromatograph valve 30 switches between the column 26 and the bypass 28. In the embodiment of FIG. 1, the gas chromatograph valve 30, the column 26 and the bypass 28 are comprised in the gas flow path connecting the secondary sensor outlet 18 with the gas chromatograph sensor 24. This gas flow path also comprises the additional gas pump 54. In the embodiment according to FIG. 2, the gas chromatograph valve 30, the column 26 and the bypass 28 are comprised in the gas flow path connecting the gas modulation valve 42 and the secondary sensor assembly inlet 16.

The invention claimed is:

1. A method for adapting a concentration of a sample gas in a gas mixture to be analysed by a gas chromatograph assembly, the gas chromatograph assembly comprising:
   a sample gas inlet for introducing a sample gas to be analysed;
   a secondary gas inlet;
   a gas chromatograph sensor;
   a gas chromatograph column; and
   a gas chromatograph bypass parallel to the column,
   wherein the method comprises the following steps in the following order:
   a) introducing an amount of sample gas through the sample gas inlet;
   b) introducing an amount of secondary gas through the secondary gas inlet;
   c) mixing the sample gas and the secondary gas to a gas mixture and conducting the gas mixture via the gas chromatograph bypass;
   d) circulating the gas mixture in a gas conducting loop comprising the gas chromatograph bypass and the gas chromatograph sensor;
   e) analysing the sample gas concentration to determine whether the sample gas concentration has reached a desired predetermined level;
   f) repeating steps b), c), d), and e) without step a) to gradually reduce the concentration of sample gas within the gas mixture until the concentration of sample gas within the gas mixture reaches the desired predetermined level; and
   g) analysing the gas mixture thus obtained by means of gas chromatography employing the gas chromatograph column and the gas chromatograph sensor.

2. The method according to claim 1, wherein the measuring of the sample gas concentration according to step e) is performed with a secondary sensor assembly.

3. The method according to claim 2, wherein during step a) the sample gas from the sample gas inlet is conducted through the secondary sensor assembly and to the gas chromatograph sensor.

4. The method according to claim 2, wherein the gas conducting loop further comprises the secondary sensor assembly.

5. The method according to claim 1, wherein the gas conducting loop comprises a gas modulation valve adapted to alternatingly connect either of the sample gas inlet and the secondary gas inlet with the gas conducting loop.

6. The method according to claim 5, wherein during step a) the gas modulation valve connects the sample gas inlet with the gas conducting loop while separating the secondary inlet from the gas conducting loop.

7. The method according to claim 5, wherein during step b) the gas modulation valve connects the secondary gas inlet with the gas conducting loop while separating the sample gas inlet from the gas conducting loop.

8. The method according to claim 1, wherein during step c) both the sample gas inlet and the secondary inlet are separated from the gas conducting loop.

9. A gas chromatograph assembly for adapting a concentration of a sample gas in a gas mixture to be analysed according to the method of claim 1, comprising:
   a sample gas inlet for introducing a sample gas to be analysed;
   a secondary gas inlet;
   a gas chromatograph sensor;
   a gas chromatograph column;
   a gas chromatograph bypass arranged parallel to the gas chromatograph column for bypassing the same;
   a gas conducting loop comprising the gas chromatograph bypass and the gas chromatograph sensor;
   a gas modulation valve adapted to alternatingly connect either of the sample gas inlet and the secondary gas inlet with the loop in order to mix the sample gas and the secondary gas to a gas mixture; and
   a gas chromatograph valve adapted to switch between the gas chromatograph column and the gas chromatograph bypass to conduct the gas mixture either through the gas chromatograph column or the gas chromatograph bypass into the gas chromatograph sensor in order to gradually reduce the concentration of sample gas within the gas mixture until the concentration of sample gas within the gas mixture reaches a desired predetermined level before the gas mixture is analysed by the gas chromatograph column.

10. The gas chromatograph assembly of claim 9, further comprising a secondary sensor assembly for measuring the sample gas concentration during or before step d).

* * * * *